Figure 1:
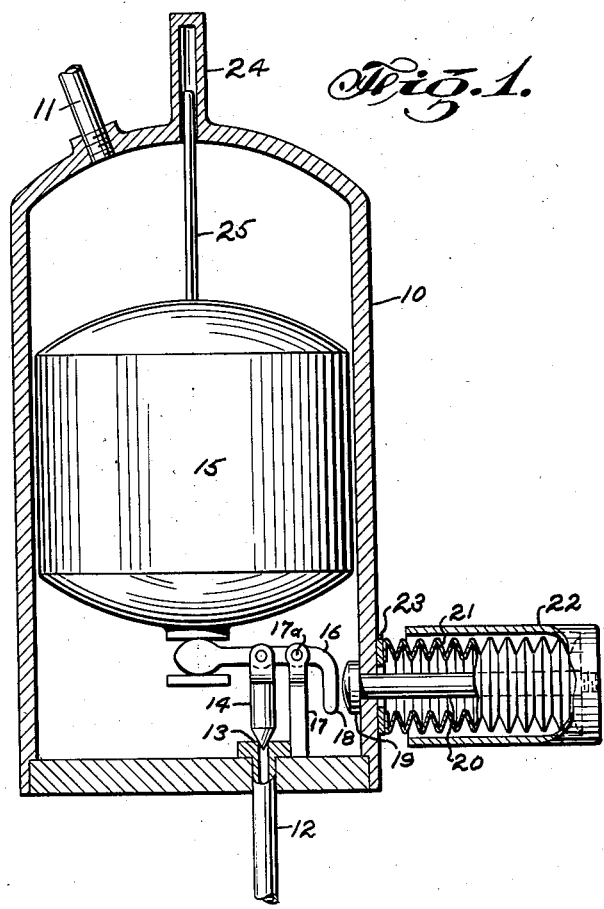

Sept. 20, 1932. W. A. KUENZLI ET AL 1,878,929
REFRIGERATION
Filed Oct. 7, 1930

INVENTORS
Walter A. Kuenzli
A. Yates Dowell

Patented Sept. 20, 1932

1,878,929

UNITED STATES PATENT OFFICE

WALTER A. KUENZLI, OF EVANSVILLE, INDIANA, AND ALVIS YATES DOWELL, OF HASTINGS-ON-HUDSON, NEW YORK, ASSIGNORS TO SERVEL INC., OF NEW YORK, N. Y., A CORPORATION OF DELAWARE

REFRIGERATION

Application filed October 7, 1930. Serial No. 486,993.

This invention relates to a refrigerating system of the compressor-condenser-evaporator type in which a float valve responsive to the volume of condensed refrigerant from the condenser controls the supply of liquid refrigerant to an evaporator of the flooded type. A valve of this character is commonly termed a high side float valve.

Occasionally a high side float valve as described above will stick due to accumulation of foreign matter on the valve seat. Also an accumulation of gas in the float chamber will prevent the proper operation of the valve by acting to prevent proper movement of the float.

This invention contemplates and is directed to a means for transmitting mechanical motion through the wall of a vessel and more particularly through the casing of a float valve, having different pressures on opposite sides of said casing for the purpose of unseating the valve or raising the float whereby this act may be accomplished readily and without the necessity of providing a temporary or permanent opening in the casing.

In the drawing—

Fig. 1 is a vertical section illustrating one application of the invention; and

Figure 2:
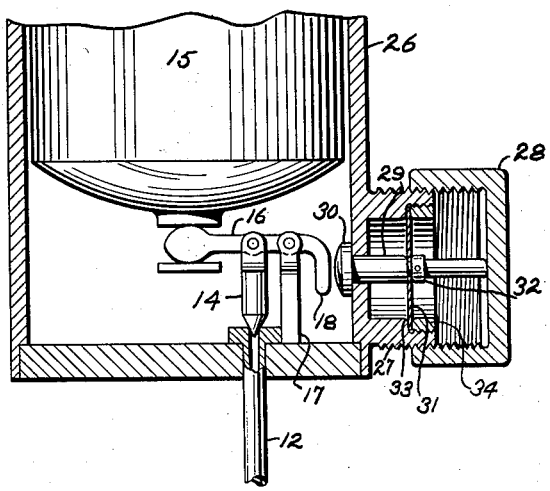

Fig. 2, a fragmentary similar view of a modified form.

Referring to Fig. 1 of the drawing, a metal casing 10 is provided with an inlet conduit 11 and a discharge conduit 12. The refrigerant is supplied from a compressor not shown through the conduit 11 into the casing 10 and is discharged from said casing through conduit 12. The upper end of the conduit 12 is provided with a seat 13 for cooperation with a valve member 14 for controlling the discharge through conduit 12.

The valve member 14 is operated by the float 15, the connection between the valve 14 and the float 15 being provided by one arm of a bellcrank 16 which is pivoted at 17a on support 17. The bellcrank 16 has its other arm 18 positioned for engagement by the head 19 of an unseating plunger 20. The plunger 20 extends outwardly through the casing 10 and is surrounded by a flexible sylphon bellows 21, and an inverted cup 22 forming a protective shell around said bellows and being attached at its closed end to the plunger 20. One end of the sylphon bellows 21 is provided with a collar 23 which is securely attached in any desired manner to make a fluid tight joint with the valve casing, and the other end is connected to make a fluid tight joint with the bottom of cap 22.

With this arrangement, when it is desired to lift the float and unseat the valve, it is only necessary to push the cap inwardly which moves plunger 20 in the same direction to operate bellcrank 16 to lift the float and unseat the valve. Sylphon bellows 21 seals the opening in casing 10 through which plunger 20 extends and also tends to return the plunger to its normal inoperative position when pressure is released from the cap 22.

The casing 10 is provided with a hollow guide 24 in which is slidable the upper end portion of an upstanding guide rod 25 mounted on the float 15, the guide and guide rod serving to maintain the float in proper centered position in the casing 10.

In Figure 2 a float chamber 26 is provided with a discharge passage 12 in which valve 14 is controlled by float 15, the valve and float being connected in the same manner as described in connection with Fig. 1. In lieu, however, of the unseating mechanism illustrated in Fig. 1, a modified type of unseating mechanism may be provided. The casing 26 may be formed with a hollow cylindrical boss 27 threaded on the exterior for the reception of a cap 28. A plunger 29 having a head 30 similar to the head 19 of the plunger 20 shown in Fig. 1 is extended through a diaphragm 31 and secured thereto in a manner to prevent leakage by some means such as a collar 32 which holds the diaphragm securely against a shoulder on the plunger. The diaphragm is secured at its periphery between a shoulder 33 within the hollow boss 27 and a screw ring 34. The plunger 29 is of sufficient length such that when the cap 28 is tightened it will move the plunger inwardly flexing the diaphragm 31 and operating bellcrank 16 to unseat the valve.

This invention is applicable to other designs and types of valves than those shown and it will be obvious to those skilled in the art that various other changes may be made in the construction and arrangement without departing from the spirit of the invention and, therefore, the invention is not limited to what is shown in the drawing and described in the specification, but only as indicated in the appended claims.

We claim:

1. In combination, a casing, a float within said casing, a valve operable by said float, a valve unseating member extending through said casing, flexible means for sealing the opening between the casing and the valve unseating member, and a cap operable for moving the valve unseating member and forming a stop for limiting the movement of the valve unseating member.

2. In combination, a casing, a float within said casing, a valve operable by said float, a valve unseating member extending through said casing, flexible means for sealing the opening between the casing and the valve unseating member, and a cap operable for moving the valve unseating member and forming a stop for limiting the movement of the valve unseating member, said cap being threadedly connected to said casing.

3. In combination, a casing, a float within said casing, a valve operable by said float, a valve unseating member extending through said casing, flexible means for sealing the opening between the casing and the valve unseating member, and a cap operable for moving the valve unseating member and forming a stop for limiting the movement of the valve unseating member, said cap being carried by the valve unseating member with the flexible sealing means between the cap and the casing.

4. A device of the character described comprising a casing, inlet and outlet pipes connected to said casing, a valve for controlling the flow through the casing, a float for controlling said valve, a lever pivotally connected to said float and to said valve, a plunger extending through said casing in a manner to engage said lever and unseat the valve, flexible means for sealing the opening between the casing and said plunger, and protective means for said flexible means movable with said plunger.

5. A device of the character described comprising a casing, inlet and outlet pipes connected to said casing, a valve for controlling the flow through the casing, a float for controlling said valve, a lever pivotally connected to said float and to said valve, a plunger extending through said casing in a manner to engage said lever and unseat the valve, and flexible means for sealing the opening between the casing and said plunger, said flexible means comprising a diaphragm, and a cap substantially enclosing said diaphragm and operable to move the plunger.

In testimony whereof we affix our signatures.

WALTER A. KUENZLI.
ALVIS YATES DOWELL.